United States Patent
Sitarski

(10) Patent No.: US 8,818,620 B1
(45) Date of Patent: Aug. 26, 2014

(54) SYSTEMS AND VEHICLES FOR DETERMINING AN OPERATIONAL STATUS OF AT LEAST ONE TRAILER BRAKE

(71) Applicant: Toyota Motor Engineering & Manufacturing North America, Inc., Erlanger, KY (US)

(72) Inventor: Nicholas Scott Sitarski, Ypsilanti, MI (US)

(73) Assignee: Toyota Motor Engineering & Manufacturing North America, Inc., Erlanger, NY (US)

( * ) Notice: Subject to any disclaimer, the term of this patent is extended or adjusted under 35 U.S.C. 154(b) by 15 days.

(21) Appl. No.: 13/780,278

(22) Filed: Feb. 28, 2013

(51) Int. Cl.
*G01M 17/00* (2006.01)
*B60T 17/22* (2006.01)

(52) U.S. Cl.
CPC .................................. *B60T 17/221* (2013.01)
USPC ....................................................... 701/34.4

(58) Field of Classification Search
USPC ................ 701/1, 29.1, 30.8, 31.9, 34.3, 34.4
See application file for complete search history.

(56) References Cited

U.S. PATENT DOCUMENTS

| | | | |
|---|---|---|---|
| 5,920,128 A | 7/1999 | Hines | |
| 6,068,351 A | 5/2000 | Martin-Gerez | |
| 6,068,352 A | 5/2000 | Kulkarni et al. | |
| 6,323,651 B2 | 11/2001 | Melendez | |
| 7,575,286 B2 | 8/2009 | Robertson | |
| 8,180,546 B2 | 5/2012 | Culbert et al. | |
| RE43,537 E | 7/2012 | Davis | |
| 2008/0143179 A1* | 6/2008 | Rutherford | 303/160 |
| 2009/0204303 A1* | 8/2009 | Leschuk et al. | 701/71 |
| 2012/0010779 A1 | 1/2012 | Staufer et al. | |

* cited by examiner

*Primary Examiner* — Kim T Nguyen
(74) *Attorney, Agent, or Firm* — Dinsmore & Shohl LLP

(57) ABSTRACT

Systems and vehicles for determining an operational status of at least one trailer brake are provided. A system for determining an operational status of at least one trailer brake includes machine readable instructions stored in one or more memory modules that, when executed by one or more processors, cause the system to command a trailer brake current output circuit to intermittently supply a diagnostic current to the at least one trailer brake during a trailer brake activation period, receive a sensed current signal from a trailer brake current sensing circuit in response to the command to supply the diagnostic current, and determine the operational status of the at least one trailer brake based on the sensed current signal.

20 Claims, 2 Drawing Sheets

US 8,818,620 B1

SYSTEMS AND VEHICLES FOR DETERMINING AN OPERATIONAL STATUS OF AT LEAST ONE TRAILER BRAKE

TECHNICAL FIELD

The present specification generally relates to systems and vehicles for trailer brake control and, more specifically, to systems and vehicles for determining an operational status of at least one trailer brake.

BACKGROUND

Trailers (e.g., recreational trailers, utility trailers, boat trailers, semi-trailers, and the like) may be towed by vehicles (e.g., automobiles and trucks). Some trailers are provided with trailer brakes, such as electric trailer brakes. Electric trailer brakes typically include brake shoes that frictionally engage a drum when activated. In such systems, an electromagnet is typically mounted on one end of a lever in order to actuate the brake shoes. When an electric current is applied to the electromagnet, the lever is pivoted as the electromagnet is drawn against the rotating brake drum, thereby actuating the electric trailer brakes. Electric braking systems include a trailer brake controller coupled to the towing vehicle that controls the application of the electric current to the trailer brakes, and thereby controls trailer braking. It may be desirable to determine an operational status of trailer brakes to determine whether the trailer brakes are malfunctioning, whether the trailer brakes are connected, etc.

Accordingly, a need exists for systems and vehicles for determining an operational status of at least one trailer brake.

SUMMARY

In one embodiment, a system for determining an operational status of at least one trailer brake includes one or more processors, one or more memory modules communicatively coupled to the one or more processors, a trailer brake current output circuit electrically coupled to the at least one trailer brake and communicatively coupled to the one or more processors, a trailer brake current sensing circuit electrically coupled to the at least one trailer brake and communicatively coupled to the one or more processors, a trailer brake activation input circuit communicatively coupled to the one or more processors, and machine readable instructions stored in the one or more memory modules. When executed by the one or more processors, the machine readable instructions cause the system to command the trailer brake current output circuit to intermittently supply a diagnostic current to the at least one trailer brake during a trailer brake activation period and during a non-activation period. A trailer brake activation signal is received from the trailer brake activation input circuit during the trailer brake activation period. When executed by the one or more processors, the machine readable instructions further cause the system to receive a sensed current signal from the trailer brake current sensing circuit in response to the command to supply the diagnostic current and determine the operational status of the at least one trailer brake based on the sensed current signal.

In another embodiment, a system for determining an operational status of at least one trailer brake includes one or more processors, one or more memory modules communicatively coupled to the one or more processors, a trailer brake current output circuit electrically coupled to the at least one trailer brake and communicatively coupled to the one or more processors, a trailer brake current sensing circuit electrically coupled to the at least one trailer brake and communicatively coupled to the one or more processors, a trailer brake activation input circuit communicatively coupled to the one or more processors, and machine readable instructions stored in the one or more memory modules. When executed by the one or more processors, the machine readable instructions cause the system to command the trailer brake current output circuit to intermittently supply a diagnostic current to the at least one trailer brake during a trailer brake activation period. A trailer brake activation signal is received from the trailer brake activation input circuit during the trailer brake activation period. When executed by the one or more processors, the machine readable instructions further cause the system to receive a sensed current signal from the trailer brake current sensing circuit in response to the command to supply the diagnostic current and determine the operational status of the at least one trailer brake based on the sensed current signal.

In yet another embodiment, a vehicle for determining an operational status of at least one trailer brake includes one or more processors, one or more memory modules communicatively coupled to the one or more processors, a trailer brake current output circuit electrically coupled to the at least one trailer brake and communicatively coupled to the one or more processors, a trailer brake current sensing circuit electrically coupled to the at least one trailer brake and communicatively coupled to the one or more processors, a trailer brake activation input circuit communicatively coupled to the one or more processors, and machine readable instructions stored in the one or more memory modules. When executed by the one or more processors, the machine readable instructions cause the vehicle to command the trailer brake current output circuit to intermittently supply a diagnostic current to the at least one trailer brake during a trailer brake activation period and during a non-activation period. A trailer brake activation signal is received from the trailer brake activation input circuit during the trailer brake activation period. When executed by the one or more processors, the machine readable instructions further cause the vehicle to receive a sensed current signal from the trailer brake current sensing circuit in response to the command to supply the diagnostic current and determine the operational status of the at least one trailer brake based on the sensed current signal.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
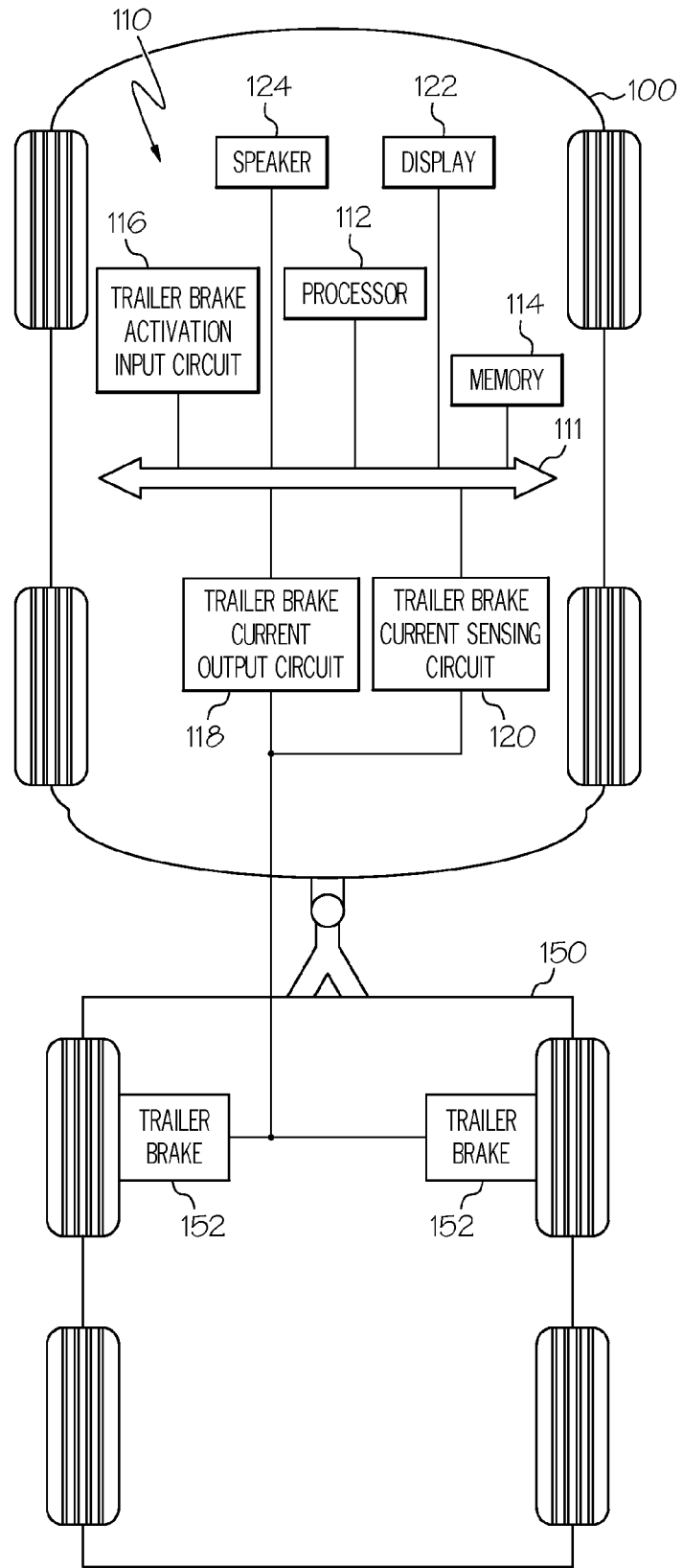
FIG. 1 schematically depicts a vehicle including a system for determining an operational status of at least one trailer brake of a trailer connected to the vehicle, according to one or more embodiments shown and described herein.
Figure 2:
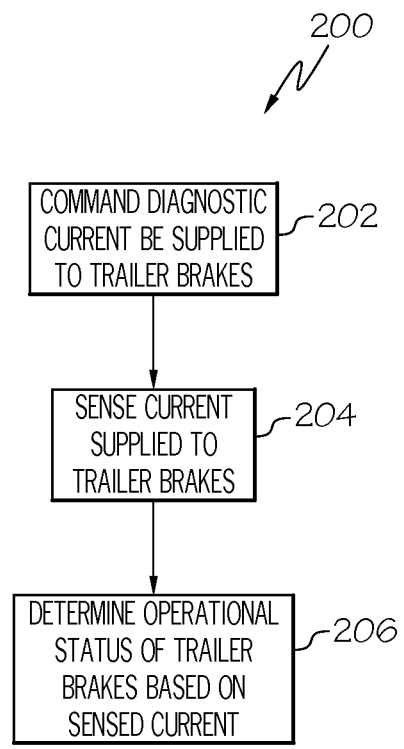
FIG. 2 schematically depicts a flowchart for determining an operational status of at least one trailer brake, according to one or more embodiments shown and described herein.

The embodiments disclosed herein include systems and vehicles for determining an operational status of at least one trailer brake. Referring generally to FIGS. 1 and 2, a system for determining an operational status of a trailer brake may include a processor, a memory module, a trailer brake current output circuit, a trailer brake current sensing circuit, a trailer brake activation input circuit, and machine readable instructions stored in the memory module. The machine readable instructions may cause the system to command the trailer brake current output circuit to intermittently supply a diagnostic current to the trailer brake during a trailer brake activation period, receive a sensed current signal from the trailer brake current sensing circuit in response to the command to supply the diagnostic current, and determine the operational status of the trailer brake based on the sensed current signal. By supplying the diagnostic current during a trailer brake activation period, additional operational status information pertaining to the at least one trailer brake may be able to be determined during the trailer brake activation period, which may be utilized for a number of purposes. The various systems and vehicles for determining an operational status of at least one trailer brake will be described in more detail herein with specific reference to the corresponding drawings.

Referring now to FIG. 1, an embodiment of an exemplary vehicle 100 including an exemplary system 110 for determining an operational status of at least one trailer brake 152 of a trailer 150 connected to the vehicle 100 is schematically depicted. The vehicle 100 may be an automobile or any other passenger or non-passenger vehicle such as, for example, a tractor or a tractor truck. The trailer 150 may be any unpowered vehicle including one or more wheels capable of being pulled by the vehicle 100 such as, for example, a recreational trailer, a utility trailer, a boat trailer, a semi-trailer, and the like. As depicted in FIG. 1, the trailer 150 includes two trailer brakes 152, one coupled to each wheel of the front axle. However, it should be understood that in other embodiments, the trailer 150 may include more than or less than two trailer brakes 152, such as in embodiments in which the trailer 150 includes multiple axles with one or more trailer brakes 152 associated with each axle.

The system 110 for determining the operational status of at least one trailer brake 152 includes a communication path 111, one or more processors 112, one or more memory modules 114, a trailer brake activation input circuit 116, a trailer brake current output circuit 118, a trailer brake current sensing circuit 120, an optional display 122, and an optional speaker 124. The various components of the system 110 and the interaction thereof will be described in detail below.

The communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 comprises a combination of conductive traces, conductive wires, connectors, and buses that cooperate to permit the transmission of electrical data signals to components such as processors, memories, sensors, input devices, output devices, and communication devices. Accordingly, the communication path 111 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the system 110. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 112 of the system 110 may be any device capable of executing machine readable instructions. Accordingly, each of the one or more processors 112 may be a controller, an integrated circuit, a microchip, a computer, or any other computing device. The one or more processors 112 are communicatively coupled to the other components of the system 110 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data.

Each of the one or more memory modules 114 of the system 110 is coupled to the communication path 111 and communicatively coupled to the one or more processors 112. The one or more memory modules 114 may comprise RAM, ROM, flash memories, hard drives, or any device capable of storing machine readable instructions such that the machine readable instructions can be accessed and executed by the one or more processors 112. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, the trailer brake activation input circuit 116 is coupled to the communication path 111 and communicatively coupled to the one or more processors 112. The trailer brake activation input circuit 116 provides a trailer brake activation signal to the one or more processors 112 that may be processed in order to determine when the at least one trailer brake 152 is to be activated. In some embodiments, the trailer brake activation input circuit 116 may include one or more sensors and/or devices for generating a signal which may be utilized by the system 110 in determining whether to activate the at least one trailer brake 152. For example, in some embodiments, the trailer brake activation input circuit 116 may include one or more accelerometers, a vehicle brake pressure sensing circuit, a manual trailer brake activation input (e.g., a pushbutton, slider switch, and the like), a vehicle brake light circuit, or combinations thereof.

The trailer brake current output circuit 118 is coupled to the communication path 111 and communicatively coupled to the one or more processors 112. The trailer brake current output circuit 118 is electrically coupled to the at least one trailer brake 152 by a conductive medium, such as a conductive wire. The trailer brake current output circuit 118 is controlled by the one or more processors 112 and supplies current to the at least one trailer brake 152 via the conductive medium when commanded by the one or more processors 112. In some embodiments, the trailer brake current output circuit 118 may supply current from the power system of the vehicle 100. The trailer brake current output circuit 118 generally includes one or more electrical components, such as resistors, capacitors, transistors, inductors, and the like. In some embodiments, the trailer brake current output circuit 118 may include at least one power transistor, such as a MOSFET transistor.

Still referring to FIG. 1, the exemplary trailer brake current sensing circuit 120 is coupled to the communication path 111 and communicatively coupled to the one or more processors 112. The trailer brake current sensing circuit 120 is electrically coupled to the at least one trailer brake 152 and the trailer brake current output circuit 118 by a conductive medium, such as a conductive wire. The trailer brake current sensing circuit 120 senses the current supplied by the trailer brake current output circuit to the at least one trailer brake 152 and provides the sensed current to the one or more processors 112. The trailer brake current sensing circuit 120 generally includes one or more electrical components, such as resistors, capacitors, transistors, amplifiers, and the like. For example, in one embodiment, the trailer brake current sensing circuit 120 may provide an indication of a voltage drop across a resistor to the one or more processors 112, which may determine the current supplied to the at least one trailer brake 152 based on the voltage drop.

Referring still to FIG. 1, the exemplary system 110 comprises a display 122 for providing visual output such as, for example, information or notifications pertaining to the operational status of the at least one trailer brake 152. The display 122 is coupled to the communication path 111 and communicatively coupled to the one or more processors 112. The display 122 may include any medium capable of transmitting an optical output such as, for example, light emitting diodes, a liquid crystal display, a plasma display, or the like. In some embodiments, the display 122 may include a combination meter positioned on a dashboard of the vehicle 100. It is noted that the display 122 can include at least one of the one or more processors 112 and/or at least one of the one or memory modules 114. Additionally, it should be understood that in some embodiments, the system 110 does not include the display 122, such as in embodiments in which the system 110 does not provide visual output of information or notifications pertaining to the operational status of the at least one trailer brake 152.

The system 110 depicted in FIG. 1 comprises a speaker 124 for transforming data signals from the system 110 into mechanical vibrations, such as in order to provide an audible indication of the operational status of the at least one trailer brake 152. The speaker 124 is coupled to the communication path 111 and communicatively coupled to the one or more processors 112. However, it should be understood that in other embodiments the system 110 may not include the speaker 124, such as in embodiments in which the system 110 does not provide an audible indication of the operational status of the at least one trailer brake 152.

FIG. 2 schematically depicts an exemplary flowchart 200 for determining an operational status of at least one trailer brake 152. Referring now to FIGS. 1 and 2, in block 202, the machine readable instructions stored in the one or more memory modules 114, when executed by the one or more processors 112, cause the system 110 to command the trailer brake current output circuit 118 to intermittently supply a diagnostic current to the at least one trailer brake 152. In some embodiments, the system 110 commands the trailer brake current output circuit 118 to intermittently supply a diagnostic current to the at least one trailer brake 152 during a trailer brake activation period. A trailer brake activation period is a period during which a trailer brake activation signal is received from the trailer brake activation input circuit 116. In some embodiments, the system 110 commands the trailer brake current output circuit 118 to intermittently supply a diagnostic current to the at least one trailer brake 152 during a trailer brake activation period and during a non-activation period. A non-activation period is a period during which a trailer brake activation signal is not received from the trailer brake activation input circuit 116. By supplying the diagnostic current during a trailer brake activation period, additional operational status information pertaining to the at least one trailer brake 152 may be able to be determined. Furthermore, by supplying the diagnostic current during a trailer brake activation period and during a non-activation period, operational status information pertaining to the at least one trailer brake 152 may be able to be determined both during times when the at least one trailer brake 152 is activated and during times when the at least one trailer brake 152 is not activated. The additional operational status information may facilitate notification of the operational status of the at least one trailer brake 152 to be provided to a driver of the vehicle 100 and/or corrective action to be taken when a malfunction is detected regardless of whether the at least one trailer brake 152 is activated. In some embodiments, the system 110 commands the trailer brake current output circuit 118 to intermittently supply a diagnostic current to the at least one trailer brake 152 at random times. In such embodiments, the one or more processors 112 may determine the random times to supply the diagnostic current based on a random number generator. In other embodiments, the system 110 commands the trailer brake current output circuit 118 to intermittently supply the diagnostic current to the at least one trailer brake 152 at regular intervals.

Still referring to block 202 of FIG. 2 in the context of FIG. 1, the machine readable instructions stored in the one or more memory modules 114, when executed by the one or more processors 112, cause the system 110 to command the trailer brake current output circuit 118 to intermittently supply a diagnostic current to the at least one trailer brake 152 by providing a pulse-width-modulated diagnostic current command signal to the trailer brake current output circuit 118. In such embodiments, the trailer brake current output circuit 118 supplies the diagnostic current to the at least one trailer brake 152 in proportion to the pulse-width modulated diagnostic current command signal. However, it should be understood that in other embodiments, the diagnostic current command signal may have a waveform other than a pulse-width-modulated waveform.

In some embodiments in which the diagnostic current is commanded to be supplied by providing a pulse-width-modulated diagnostic current command signal to the trailer brake current output circuit 118, the voltage and/or frequency of the pulse-width-modulated diagnostic current command signal may be different form the voltage and/or frequency of a pulse-width modulated brake activation current command signal that is supplied to the trailer brake current output circuit 118 in response to receiving the trailer brake activation signal from the trailer brake activation input circuit. For example, in some embodiments, the pulse-width modulated brake activation current command signal has a first voltage level and a first frequency and the pulse-width modulated diagnostic current command signal has a second voltage level and a second frequency. The first voltage level may be greater than the second voltage level, such that the pulse-width-modulated activation current command signal has a higher voltage than the pulse-width-modulated diagnostic current command signal. By way of non-limiting example, the first voltage level of the pulse-width-modulated activation current command signal may be about 5 volts and the second voltage level of the pulse-width-modulated diagnostic current command signal may be about 1 volt. In some embodiments, the second frequency may be greater than the first frequency, such that the pulse-width-modulated diagnostic current command signal has a higher frequency than the pulse-width-modulated activation current command signal. In some embodiments, both the frequency and the voltage of the pulse-width-modulated activation current command signal and the pulse-width-modulated diagnostic current command signal may be differ, while in other embodiments only one of the voltage and frequency may differ.

In some embodiments, the diagnostic command is provided by a diagnostic current command conductor and the activation current command is provided by an activation current command conductor. In some embodiments, the diagnostic current command conductor and the activation current command conductor may be separate conductors on a printed circuit board. In some embodiments, the diagnostic current command conductor and the activation current command conductor may be separate conductive wires. In some embodiments, the diagnostic current command conductor and the activation current command conductor may be separate output pins of the one or more processors 112. For example, in some embodiments, the diagnostic current command may be provide by a first output pin of the one or more processors 112 and the activation current command may be provided by a second output pin of the one or more processors 112. In such embodiments, a diode may connect the first output pin of the one or more processors 112 to the second output pin of the one or more processors 112. In embodiments in which the diagnostic current command and the activation current command are provided by separate output pins of the one or more processors 112, the diagnostic current command signal may be provided to the trailer brake current output circuit 118 during the trailer brake activation period and the non-activation period (i.e., regardless of whether the activation current command is provided to the trailer brake current output circuit 118). By providing a separate diagnostic current command via a separate output pin of the processor so that the diagnostic current may be supplied both during the trailer brake activation period and the non-activation period in order to obtain additional operational status information pertaining to the at least one trailer brake 152, the system 110 may be more complicated and/or expensive than if a single output pin were used to provide both the diagnostic current command during the non-activation period and the activation current during the trailer brake activation period.

The diagnostic current commanded to be supplied in block 202 is generally below an activation threshold, such that if the diagnostic current is supplied to the at least one trailer brake 152, the at least one trailer brake 152 would not be activated. For example, in some embodiments in which the at least one trailer brake 152 includes a brake shoe that is activated by an electromagnet coupled to a brake shoe that causes the brake shoe to be drawn against and frictionally engage a brake drum when sufficient current is supplied to the electromagnet to cause the brake shoe to engage the drum, the diagnostic current may be below the activation threshold required to draw the electromagnet to the drum.

Still referring to FIGS. 1 and 2, in block 204, the machine readable instructions stored in the one or more memory modules 114, when executed by the one or more processors 112, cause the system 110 to receive a sensed current signal from the trailer brake current sensing circuit 120 in response to the command to supply the diagnostic current provided in block 202. In some embodiments, the one or more processors 112 may determine a magnitude of the sensed current after a predetermined delay has elapsed from the when the trailer brake current output circuit 118 is commanded to supply the diagnostic current. In some embodiments, the trailer brake current sensing circuit 120 may provide an indication of a voltage drop across a resistor to the one or more processors 112, which may determine the current supplied to the at least one trailer brake 152 based on the voltage drop. However, it should be understood that the trailer brake current sensing circuit 120 may sense the current in a number of other ways, such as in embodiments in which the trailer brake current sensing circuit 120 includes one or more standalone integrated circuits.

Still referring to FIGS. 1 and 2, in block 206, the machine readable instructions stored in the one or more memory modules 114, when executed by the one or more processors 112, cause the system 110 to determine the operational status of the at least one trailer brake 152 based on the current signal sensed in block 204. By way of non-limiting example, in some embodiments, the system 110 may determine that the at least one trailer brake 152 is unconnected from the system 110 when the sensed current signal is indicative of a sensed current below a connection threshold. Similarly, in some embodiments, the system 110 may determine that the at least one trailer brake 152 is connected to the system 110 based on the sensed current. As another non-limiting example, in some embodiments, the system 110 may determine that a short circuit condition exists when the sensed current signal is indicative of a sensed current above a short circuit threshold. It should be understood that the system 110 may determine a variety of other operational statuses of the at least one trailer brake 152 other than a short circuit condition or an unconnected status.

Some embodiments may utilize the operational status of the at least one trailer brake 152 determined in block 206 to perform additional tasks. For example, a visual indication of the operational status may be provided to a driver of the vehicle 100 via the display 122. In some embodiments, the display 122 may illuminate a connection status indicator based on the determination that the at least one trailer brake 152 is either connected or unconnected from the system 110. In some embodiments, the display 122 may illuminate a malfunction indicator (indicating a malfunction of the at least one trailer brake 152) based on the determined operational status, such as when a short circuit condition is detected at block 206. It should be understood that many other types of information may be provided by the display 122 based on the operational status.

As another non-limiting example of the system 110 using the determined operational status for additional tasks, an audible indication of the operational status of the at least one trailer brake 152 may be provided by the speaker 124. In some embodiments, the speaker 124 may provide an audible indication indicative of the connection status indicator based on the determination that the at least one trailer brake 152 is either connected or unconnected from the system 110, such as beeping or emitting a tone when the at least one trailer brake 152 is connected and/or unconnected from the system 110. In some embodiments, the speaker 124 may provide an audible indication indicative of a malfunction of the at least one trailer brake 152 based on the determined operational status, such as when a warning sound is emitted when a short circuit condition is detected at block 206. It should be understood that many other types of information may be provided by the speaker 124 based on the operational status.

It should now be understood that embodiments described herein provide systems and vehicles for determining an operational status of at least one trailer brake. By supplying the diagnostic current during a trailer brake activation period, additional operational status information pertaining to the at least one trailer brake may be able to be determined. Furthermore, by supplying the diagnostic current during a trailer brake activation period and during a non-activation period, operational status information pertaining to the at least one trailer brake may be able to be determined both during times when the at least one trailer brake is activated and during times when the at least one trailer brake is not activated, which may thereby facilitate notification of the operational status of the at least one trailer brake to be provided to a driver of the vehicle and/or corrective action to be taken when a malfunction is detected.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for determining an operational status of at least one trailer brake comprising:
   one or more processors;
   one or more memory modules communicatively coupled to the one or more processors;
   a trailer brake current output circuit electrically coupled to the at least one trailer brake and communicatively coupled to the one or more processors;
   a trailer brake current sensing circuit electrically coupled to the at least one trailer brake and communicatively coupled to the one or more processors;
   a trailer brake activation input circuit communicatively coupled to the one or more processors;
   machine readable instructions stored in the one or more memory modules that cause the system to perform at least the following when executed by the one or more processors:
      command the trailer brake current output circuit to intermittently supply a diagnostic current to the at least one trailer brake during a trailer brake activation period and during a non-activation period, wherein a trailer brake activation signal is received from the trailer brake activation input circuit during the trailer brake activation period;
      receive a sensed current signal from the trailer brake current sensing circuit in response to the command to supply the diagnostic current; and
      determine the operational status of the at least one trailer brake based on the sensed current signal.

2. The system of claim 1, wherein the machine readable instructions stored in the one or more memory modules that cause the system to command the trailer brake current output circuit to intermittently supply the diagnostic current to the at least one trailer brake cause the system to:
   provide a pulse-width-modulated diagnostic current command signal to the trailer brake current output circuit, wherein the trailer brake current output circuit supplies the diagnostic current to the at least one trailer brake based on the pulse-width modulated diagnostic current command signal.

3. The system of claim 2, further comprising a diagnostic current command conductor and an activation current command conductor, wherein the diagnostic command is provided by the diagnostic current command conductor and the activation current command is provided by the activation current command conductor.

4. The system of claim 2, wherein the machine readable instructions stored in the one or more memory modules further cause the system to:
   provide a pulse-width-modulated brake activation current command signal to the trailer brake current output circuit in response to receiving the trailer brake activation signal from the trailer brake activation input circuit, wherein the trailer brake current output circuit supplies a brake activation current to the at least one trailer brake based on the pulse-width modulated brake activation current command signal, wherein the pulse-width modulated brake activation current command signal has a first voltage level and a first frequency, wherein the pulse-width modulated diagnostic current command signal has a second voltage level and a second frequency, and wherein the first voltage level is greater than the second voltage level and the second frequency is greater than the first frequency.

5. The system of claim 4, wherein the machine readable instructions stored in the one or more memory modules that cause the system to determine the operational status of the at least one trailer brake based on the sensed current signal cause the system to:
   determine that the at least one trailer brake is unconnected from the system when the sensed current signal is indicative of a sensed current below a connection threshold.

6. The system of claim 4, wherein the machine readable instructions stored in the one or more memory modules that cause the system to determine the operational status of the at least one trailer brake based on the sensed current signal cause the system to:
   determine that a short circuit condition exists when the sensed current signal is indicative of a sensed current above a short circuit threshold.

7. The system of claim 1, wherein the machine readable instructions stored in the one or more memory modules that cause the system to command the trailer brake current output circuit to intermittently supply the diagnostic current to the at least one trailer brake cause the system to:
   command the trailer brake current output circuit to intermittently supply the diagnostic current to the at least one trailer brake at random times.

8. The system of claim 1, wherein the diagnostic current is below an activation threshold.

9. A system for determining an operational status of at least one trailer brake comprising:
   one or more processors;
   one or more memory modules communicatively coupled to the one or more processors;
   a trailer brake current output circuit electrically coupled to the at least one trailer brake and communicatively coupled to the one or more processors;

a trailer brake current sensing circuit electrically coupled to the at least one trailer brake and communicatively coupled to the one or more processors;

a trailer brake activation input circuit communicatively coupled to the one or more processors;

machine readable instructions stored in the one or more memory modules that cause the system to perform at least the following when executed by the one or more processors:

command the trailer brake current output circuit to intermittently supply a diagnostic current to the at least one trailer brake during a trailer brake activation period, wherein a trailer brake activation signal is received from the trailer brake activation input circuit during the trailer brake activation period;

receive a sensed current signal from the trailer brake current sensing circuit in response to the command to supply the diagnostic current; and determine the operational status of the at least one trailer brake based on the sensed current signal.

10. The system of claim 9, wherein the machine readable instructions stored in the one or more memory modules that cause the system to determine the operational status of the at least one trailer brake based on the sensed current signal cause the system to:

determine that the at least one trailer brake is unconnected from the system when the sensed current signal is indicative of a sensed current below a connection threshold.

11. The system of claim 9, wherein the machine readable instructions stored in the one or more memory modules that cause the system to determine the operational status of the at least one trailer brake based on the sensed current signal cause the system to:

determine that a short circuit condition exists when the sensed current signal is indicative of a sensed current above a short circuit threshold.

12. The system of claim 9, wherein the machine readable instructions stored in the one or more memory modules that cause the system to command the trailer brake current output circuit to intermittently supply the diagnostic current to the at least one trailer brake cause the system to:

command the trailer brake current output circuit to intermittently supply the diagnostic current to the at least one trailer brake at random times.

13. The system of claim 9, wherein the machine readable instructions stored in the one or more memory modules that cause the system to command the trailer brake current output circuit to intermittently supply the diagnostic current to the at least one trailer brake cause the system to:

provide a pulse-width-modulated diagnostic current command signal to the trailer brake current output circuit, wherein the trailer brake current output circuit supplies the diagnostic current to the at least one trailer brake based on the pulse-width modulated diagnostic current command signal.

14. The system of claim 13, wherein the trailer brake current output circuit includes at least one transistor.

15. The system of claim 13, wherein the machine readable instructions stored in the one or more memory modules further cause the system to:

provide a pulse-width-modulated brake activation current command signal to the trailer brake current output circuit in response to receiving a trailer brake activation signal from the trailer brake activation input circuit, wherein the trailer brake current output circuit supplies a brake activation current to the at least one trailer brake based on the pulse-width modulated brake activation current command signal, wherein the pulse-width modulated brake activation current command signal has a first voltage level and a first frequency, wherein the pulse-width modulated diagnostic current command signal has a second voltage level and a second frequency, and wherein the first voltage level is greater than the second voltage level and the second frequency is greater than the first frequency.

16. The system of claim 9, wherein the diagnostic current is below an activation threshold.

17. A vehicle for determining an operational status of at least one trailer brake of a trailer towed by the vehicle, the vehicle comprising:

one or more processors;

one or more memory modules communicatively coupled to the one or more processors;

a trailer brake current output circuit electrically coupled to the at least one trailer brake and communicatively coupled to the one or more processors;

a trailer brake current sensing circuit electrically coupled to the at least one trailer brake and communicatively coupled to the one or more processors;

a trailer brake activation input circuit communicatively coupled to the one or more processors;

machine readable instructions stored in the one or more memory modules that cause the vehicle to perform at least the following when executed by the one or more processors:

command the trailer brake current output circuit to intermittently supply a diagnostic current to the at least one trailer brake during a trailer brake activation period and during a non-activation period, wherein a trailer brake activation signal is received from the trailer brake activation input circuit during the trailer brake activation period;

receive a sensed current signal from the trailer brake current sensing circuit in response to the command to supply the diagnostic current; and determine the operational status of the at least one trailer brake based on the sensed current signal.

18. The vehicle of claim 17, wherein the machine readable instructions stored in the one or more memory modules that cause the vehicle to command the trailer brake current output circuit to intermittently supply the diagnostic current to the at least one trailer brake cause the vehicle to:

provide a pulse-width-modulated diagnostic current command signal to the trailer brake current output circuit, wherein the trailer brake current output circuit supplies the diagnostic current to the at least one trailer brake based on the pulse-width modulated diagnostic current command signal.

19. The vehicle of claim 17, wherein the machine readable instructions stored in the one or more memory modules further cause the vehicle to:

provide a pulse-width-modulated brake activation current command signal to the trailer brake current output circuit in response to receiving the trailer brake activation signal from the trailer brake activation input circuit, wherein the trailer brake current output circuit supplies a brake activation current to the at least one trailer brake based on the pulse-width modulated brake activation current command signal, wherein the pulse-width modulated brake activation current command signal has a first voltage level and a first frequency, wherein the pulse-width modulated diagnostic current command signal has a second voltage level and a second frequency, and wherein the first voltage level is greater than the second voltage level and the second frequency is greater than the first frequency.

20. The vehicle of claim 17, wherein the machine readable instructions stored in the one or more memory modules that cause the vehicle to command the trailer brake current output circuit to intermittently supply the diagnostic current to the at least one trailer brake cause the vehicle to:

command the trailer brake current output circuit to intermittently supply the diagnostic current to the at least one trailer brake at random times.

\* \* \* \* \*